United States Patent [19]

Usui et al.

[11] Patent Number: 4,988,483

[45] Date of Patent: Jan. 29, 1991

[54] EXHAUST GAS CLEANING APPARATUS

[75] Inventors: Masayoshi Usui, Numazu; Haruo Serizawa, Shizuoka, both of Japan

[73] Assignee: Usui Kokusai Sangyo Kabushiki Kaisha, Japan

[21] Appl. No.: 441,585

[22] Filed: Nov. 27, 1989

[30] Foreign Application Priority Data

Nov. 30, 1988 [JP] Japan ............................ 63-154940[U]

[51] Int. Cl.⁵ ................................................ B01J 8/02
[52] U.S. Cl. ..................................... 422/180; 502/527
[58] Field of Search ................. 422/180; 502/439, 527

[56] References Cited

U.S. PATENT DOCUMENTS

| | | | |
|---|---|---|---|
| 3,954,417 | 5/1976 | Jalbing | 422/180 X |
| 4,853,360 | 8/1989 | Hitachi | 502/527 X |
| 4,909,994 | 3/1990 | Kimiyoshi et al. | 422/180 |

*Primary Examiner*—W. J. Shine
*Attorney, Agent, or Firm*—Lowe, Price, LeBlanc, Becker & Shur

[57] ABSTRACT

An exhaust gas cleaning apparatus comprises a honeycomb core body adapted for carrying an exhaust gas cleaning catalyst and fitted in a tubular metal casing. The carrier body is formed by rolling or laminating a sheet-like band and a corrugated band together. The carrier body has a recess in its outer peripheral surface so that the outer peripheral surface is kept out of contact with an inner surface of the casing. This recess effectively absorbs or relaxes the stress due to large thermal strains acting between the outer peripheral surface of the carrier body and the inner surface of the casing.

8 Claims, 2 Drawing Sheets

EXHAUST GAS CLEANING APPARATUS

BACKGROUND OF THE INVENTION

1. Field of the Invention:

This invention relates an exhaust gas cleaning apparatus which is generally provided at a midpoint of an exhaust system of an automobile and which is composed of a metal-made honeycomb core body adapted for carrying thereon an exhaust gas cleaning catalyst and fitted in a tubular metal casing. More particular, the invention relates to an exhaust gas cleaning apparatus in which the constituent members of the apparatus are joined with adequate strength so as to resist against separation, cracking and other breakage due to thermal strains.

2. Description of the Related Art:

In conventional exhaust gas cleaning apparatuses of the mentioned type, a sheet-like band made of a heat-resistant thin metal sheet having a thickness of 0.1 mm or less and a corrugated band made from another thin metal sheet of the same kind are superposed one over the other to have areas of contact therebetween. They are then rolled together spirally into a honeycomb form (hereinafter called "honeycomb core body") defining many network-patterned gas flow passages along the central axis thereof for allowing exhaust gas to pass therethrough. The honeycomb core body is enclosed by a tubular metal casing which has a single-layer body and opens at opposite ends thereof. The honeycomb core body and the tubular metal casing are firmly joined by brazing, for example, so as to resist against the stress due to thermal strains resulting from the high temperature of exhaust gas as well as the exothermic reaction between exhaust gas and the exhaust gas cleaning catalyst, and also so as to resist against the severe vibrations while the automobile is running. The members of the honeycomb core body, i.e., the sheet-like band and the corrugated band are joined together at the areas of contact therebetween by a known manner.

However, this conventional arrangement cannot remain useful for a long period of time. For example, separation between the outermost peripheral surface of the honeycomb core body and the inner surface of the metal casing tend to occur, in the direction of the axis of the honeycomb core body (i.e., in the exhaust gas flowing direction), due to the temperature difference between the metal casing exposed to the outside air and the honeycomb core body inside. When this separation begins, the members of the honeycomb core body, i.e., the sheet-like and corrugated bands would be cracked o otherwise broken as vibrations from the internal engine or the automobile body are added.

Attempts have been made to solve the foregoing problem, and it has been turned out that to merely join the honeycomb core body and the metal casing together firmly is not successful.

SUMMARY OF THE INVENTION

It is therefore an object of this invention to provide an exhaust gas cleaning apparatus in which separation between the outermost peripheral surface of a honeycomb core body and the inner surface of a tubular metal casing can be prevented without bringing these two parts in complete contact with one another.

According to this invention, there is provided an exhaust gas cleaning apparatus comprising: a honeycomb core body adapted for carrying thereon an exhaust gas cleaning catalyst and composed of a sheetlike band made of a thin metal sheet and a corrugated band made from another thin metal sheet, the sheetlike band and the corrugated band being superposed one over the other in a spiral or laminate form defining many network-patterned gas flow passages along the central axis thereof; a tubular metal casing opening at opposite ends, the honeycomb core body being inserted in and fixed to the tubular metal casing; and the honeycomb core body having a recess in its outer peripheral surface except a pair of marginal portions thereof contiguous to opposite ends of the honeycomb core body, the outer peripheral surface of the honeycomb core body being kept out of contact with an inner surface of the tubular metal casing at the recess. This recess effectively absorbs or relaxes the stress due to thermal strains.

The above and other objects, features and additional advantages of this invention will become manifest to those versed in the art upon making reference to the detailed description and the accompanying drawings in which certain preferred structural embodiments incorporating the principle of this invention are shown by way of illustrative example.

DETAILED DESCRIPTION

Figure 1:
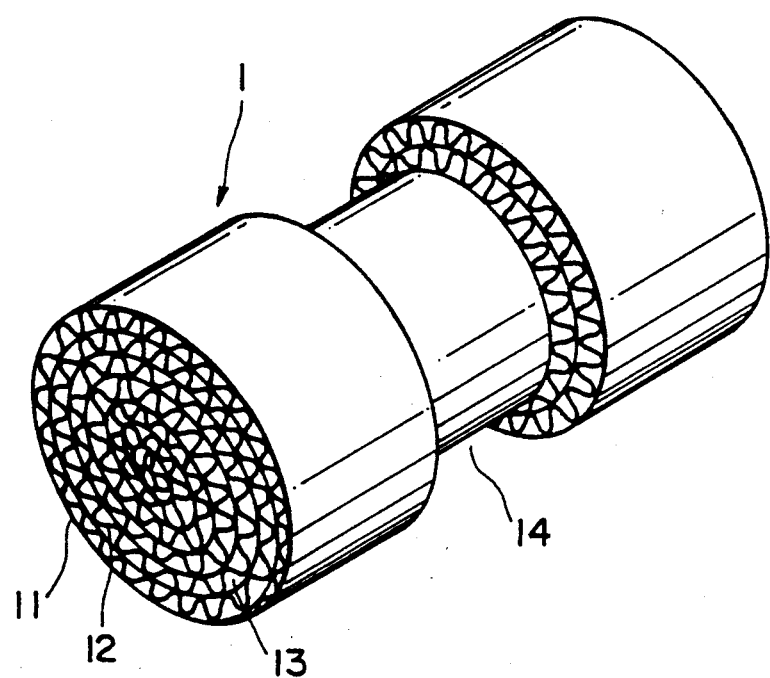
FIG. 1 is a perspective view of a honeycomb core body used in an exhaust gas cleaning apparatus of this invention, showing a recess in the form of a single groove formed in the outer peripheral surface of the honeycomb core body.

The principle of this invention is particularly useful when embodied in an exhaust gas cleaning apparatus (hereinafter also called "cleaning apparatus"). The significant features of this invention reside in the unique structure of a honeycomb core body which is enclosed by and fixed to a metal casing. More specifically, the honeycomb core body has a recess in the outer peripheral surface of the honeycomb core body so that the outer peripheral surface of the honeycomb body is kept out of contact with the inner surface of the metal casing at the recess. The recess includes one or more grooves extending circumferentially of the honeycomb core body. The individual groove has a generally U-shaped, V-shaped or rectangular cross section.

Given that the honeycomb core body has in its outer peripheral surface the above recess, the cleaning apparatus of this invention can offer a remarkably improved degree of durability when used under severe conditions, especially in the high-temperature atmosphere.

Generally, in an exhaust gas cleaning apparatus using a cylindrical metal-made honeycomb core body, the central part (axial core portion and portions thereabout) is subjected to high temperature, compared to its outer part, due to the difference in distribution of exhaust gas flow passing through the honeycomb core body (large amount of exhaust gas flow at the central part), and also due to the contact reaction (exothermic reaction) between exhaust gas and an exhaust gas cleaning catalyst carried on the surfaces of the honeycomb core body. The temperature gradient between the outermost peripheral portion and the next outer portion inwardly contiguous thereto is remarkably large, compared to the temperature gradient at and about the central part. This tendency to separate is accelerated more and more as the honeycomb core body is fixed in the metal casing exposed to the outside air.

Resulting from this, the honeycomb core structure and the metal casing tend to be separated along with time lapsing, even though the outermost peripheral surface of the honeycomb core body is fixed to the inner surface of the metal casing by brazing. In order to retard or prevent this separation phenomenon, it is necessary to adopt some measure to relax the stress due to thermal strains at the outer peripheral part of the honeycomb core body. For this purpose, the honeycomb core body of this invention has a recess in its outer peripheral surface. This recess serves to absorb the stress due to large thermal strains on and about the outer peripheral part of the honeycomb core body, thus remarkably improving the durability of an exhaust gas cleaning apparatus.

To sum up, according to the exhaust gas cleaning apparatus of this invention, since the outer peripheral surface of the honeycomb core is kept out of contact with the inner surface of the metal casing, it is possible to offer the following advantageous results:

(i) The recess formed in the outer peripheral surface effectively absorbs the axial thermal strains which will be a cause for separation the honeycomb core body and the metal casing. Accordingly, it is possible to prevent separation between the honeycomb core body and the metal casing and between the sheetlike band and the corrugated band inside the honeycomb core body as well as cracking and other breakage of these members.

(ii) Since the resistance to passage of exhaust gas at and about the outer peripheral part of the honeycomb core body is reduced by the recess, a uniform distribution of exhaust gas flow can be achieved. This also make it possible to prevent a lowered efficiency of the engine due to pressure loss. Further, uniform contact between exhaust gas and the catalyst can take place, thus causing an improved cleaning efficiency of exhaust gas.

(iii) In the recess, exhaust gas is stirred to create a turbulent flow, and therefore, the exhaust gas passing through the recess can be cleaned uniformly.

This invention will now be described more in detail by the following embodiments; however, this invention should not be limited to these specific examples.

Figure 2:
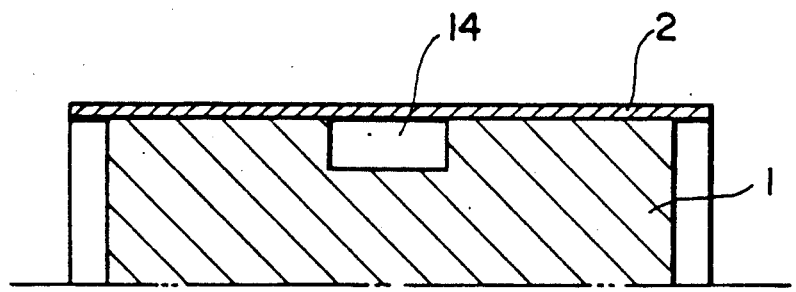
FIG. 2 is a fragmentary longitudinal crosssectional view showing an exhaust gas cleaning apparatus according to a first embodiment of this invention.

FIGS. 1 and 2 illustrate an exhaust gas cleaning apparatus according to a first embodiment of this invention; FIG. 1 is a perspective view of a honeycomb core body 1, while FIG. 2 is a fragmentary longitudinal cross-sectional view of the honeycomb core body 1 having been inserted in and fixed to a metal casing 2. The honeycomb core body 1 is formed by superposing a sheet-like band 11, made of a heat-resistant thin steel sheet, and a corrugated band 12, made from another thin steel sheet of the same kind, one over the other so as to have areas of contact therebetween and then by rolling these two members together in a spiral form. Thus the honeycomb core body 1 has been formed to define many network-patterned gas flow passages 13.

A heat-resistant steel sheet containing 20% by weight of chromium and 5% by weight of aluminum and having a thickness of 0.04 mm and a width of 70 mm is used as a sheet-like band 11. Another steel sheet of the same kind as the sheet-like band 11 is shaped in a wavy form, and the resulting wavy sheet is used as a corrugated band 12.

For the significant feature of this invention, the recess 14 formed in the outer peripheral surface of the honeycomb core body 1 will now be described more specifically.

For forming a recess 14 having a desired width and depth, each of the sheet-like and corrugated bands 11, 12 to be rolled is cut away, from its prospective outer layer end portion, a part of a predetermined width and length. As these two bands 11, 12 are rolled in a spiral form, such cutaway trailing end portions of the bands 11, 12 jointly define a recess 14 of the predetermined parameter. Alternatively, normal sheet-like and corrugated bands 11, 12 may be shaped in a spiral roll, and thereafter a recess 14 may be formed by cutting the roll on a lathe, for example. Further, after having formed a honeycomb core body of a relatively small diameter, the sheet-like and corrugated bands of a narrow width may be wound on the small-diameter honeycomb core body in a laterally spaced relation. These mentioned manners should not be essential to this invention.

Figure 3:
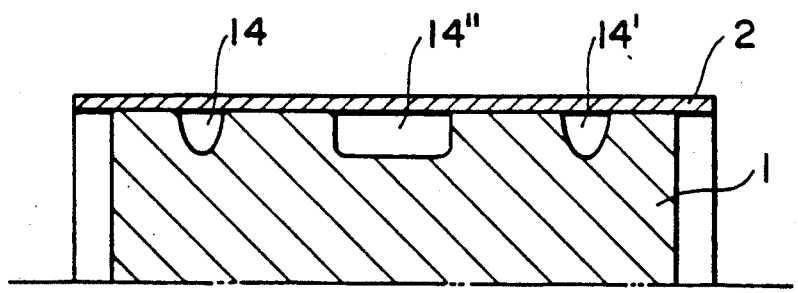
FIG. 3 is a view similar to FIG. 2, showing a modified cleaning apparatus according to a second embodiment.

FIG. 3 illustrates a modified exhaust gas cleaning apparatus according to a second embodiment. In the honeycomb core body 1 of FIG. 3, unlike that of FIG. 1, the recess includes three grooves 14, 14', 14'' extending circumferentially of the outer peripheral surface of the honeycomb core body 1. Two of the three grooves 14, 14' have a generally U-shaped cross section, while the remaining one of the grooves 14'' has a rectangular cross section with round corners.

Figure 4:
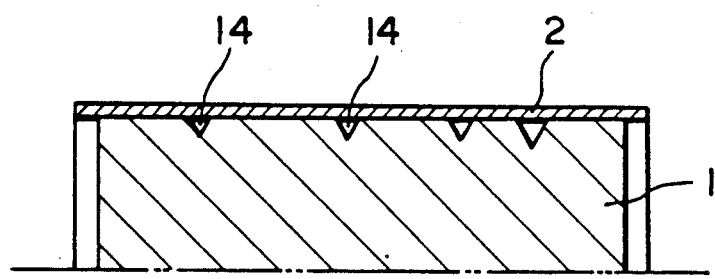
FIG. 4 is a view similar to FIGS. 2 and 3, showing another modified cleaning apparatus according to a third embodiment.

FIG. 4 illustrates another modified exhaust gas cleaning apparatus according to a third embodiment. In the honeycomb core body 1 of FIG. 4, the recess includes a plurality of grooves 14 of generally V-shaped cross section. These V-shaped grooves 14 are disposed close to one another and have different depths gradually increasing one over another in the exhaust gas flowing direction. The number, cross-sectional shape and depth of the grooves should not be limited to the disclosed specific examples. In this regard, either U-shaped, V-shaped or rectangular shaped cross section grooves may be utilized in any embodiment. Moreover, the grooves may be spaced from one another at different or irregular distances in the exhaust gas flow direction.

In connection with each of the illustrated embodiments, this specification is silent about the joining means to join the honeycomb core body and the metal casing together as well as to joint the sheet-like and corrugated bands, i.e., the constituent members of the honeycomb core body at their areas of contact. As a matter of fact, however, the joining means may be any of various known methods such as brazing, welding.

What is claimed is:

1. An exhaust gas cleaning apparatus comprising: a honeycomb core body adapted for carrying thereon an exhaust gas cleaning catalyst and composed of a sheet-like band made of a thin metal sheet and a corrugated band made from another thin metal sheet, said sheet-like band and said corrugated band being superposed one over the other in a spiral or laminate form defining many network-patterned gas flow passages along the central axis thereof; a tubular metal casing opening at opposite ends, said honeycomb core body being inserted in and fixed to said tubular metal casing; and said honeycomb core body having a recess in its outer peripheral surface except a pair of marginal portions thereof contiguous to opposite ends of said honeycomb core body, said outer peripheral surface of said honeycomb core body being kept out of contact with an inner surface of said tubular metal casing at said recess.

2. An exhaust gas cleaning apparatus according to claim 1, wherein said recess includes one or more grooves extending circumferentially of said outer peripheral surface of said honeycomb core body.

3. An exhaust gas cleaning apparatus according to claim 2, wherein each of said grooves has a U-shaped, V-shaped or rectangular cross section as viewed in an exhaust gas flowing direction.

4. An exhaust gas cleaning apparatus according to claim 2, wherein said grooves have different depths gradually increasing one after another in an exhaust gas flowing direction.

5. An exhaust gas cleaning apparatus according to claim 3, wherein said grooves have different depths gradually increasing one after another in an exhaust gas flowing direction.

6. An exhaust gas cleaning apparatus according to claim 2, wherein said grooves are spaced from one another at different distances in an exhaust gas flowing direction.

7. An exhaust gas cleaning apparatus according to claim 3, wherein said grooves are spaced from one another at different distances in an exhaust gas flowing direction.

8. An exhaust gas cleaning apparatus according to claim 4, wherein said grooves are spaced from one another at irregular distances in an exhaust gas flowing direction.

* * * * *